US008560721B2

(12) United States Patent
Lee

(10) Patent No.: US 8,560,721 B2
(45) Date of Patent: Oct. 15, 2013

(54) METHOD, SYSTEM AND SERVER PLAYING MEDIA USING USER EQUIPMENT WITH MOTION SENSOR

(75) Inventor: Joong Yun Lee, Seoul (KR)

(73) Assignee: SK Planet Co., Ltd., Seoul (KR)

( * ) Notice: Subject to any disclaimer, the term of this patent is extended or adjusted under 35 U.S.C. 154(b) by 421 days.

(21) Appl. No.: 12/678,380

(22) PCT Filed: Aug. 18, 2008

(86) PCT No.: PCT/KR2008/004786
§ 371 (c)(1),
(2), (4) Date: Mar. 16, 2010

(87) PCT Pub. No.: WO2009/064066
PCT Pub. Date: May 22, 2009

(65) Prior Publication Data
US 2010/0207873 A1 Aug. 19, 2010

(30) Foreign Application Priority Data

Nov. 15, 2007 (KR) ........................ 10-2007-0116807

(51) Int. Cl.
*G06F 15/16* (2006.01)
(52) U.S. Cl.
USPC .......................................................... 709/232
(58) Field of Classification Search
USPC .................... 709/201–236; 370/260–284; 725/115–200
See application file for complete search history.

(56) References Cited

U.S. PATENT DOCUMENTS

| 2002/0073178 A1* | 6/2002 | Jalili ............................. 709/219 |
| 2005/0149564 A1 | 7/2005 | Jain et al. |
| 2006/0197750 A1 | 9/2006 | Kerr et al. |

(Continued)

FOREIGN PATENT DOCUMENTS

| CN | 1890992 | 1/2007 |
| JP | 2004-048546 | 2/2004 |

(Continued)

OTHER PUBLICATIONS

International Search Report for PCT application No. PCT/KR2008/004786.

(Continued)

*Primary Examiner* — Joseph Avellino
*Assistant Examiner* — Mark O Afolabi
(74) *Attorney, Agent, or Firm* — Lowe Hauptman & Ham, LLP

(57) ABSTRACT

Disclosed is a method for receiving playable media stored in a server by user equipment having a motion sensor and playing the media according to the motion of the user equipment. The method includes the steps of (a) designating a part of the media as a first receiving area by the server and transmitting it to the user equipment; (b) changing a playback area, in which the media are played, according to the motion of the user equipment and playing a part of the media; and (c) requesting by the user equipment that the server provide a second receiving area, which is a part of the media including the playback area, when the playback area is outside the first receiving area of the media, receiving the second receiving area, and playing the media. When media stored in the server are to be played initially, it is unnecessary to download the entire media, so that the user equipment can play the media more efficiently.

21 Claims, 3 Drawing Sheets

(56) References Cited

U.S. PATENT DOCUMENTS

| | | | |
|---|---|---|---|
| 2007/0013539 A1* | 1/2007 | Choi et al. | 340/671 |
| 2007/0169614 A1* | 7/2007 | Sasaki et al. | 84/612 |
| 2008/0088706 A1* | 4/2008 | Girgensohn et al. | 348/207.99 |
| 2009/0113053 A1* | 4/2009 | Van Wie et al. | 709/226 |
| 2010/0031109 A1* | 2/2010 | Muramoto et al. | 714/748 |

FOREIGN PATENT DOCUMENTS

| | | |
|---|---|---|
| JP | 2007-158892 | 6/2007 |
| KR | 1020060023546 | 3/2006 |
| KR | 10-2006-0084694 | 7/2006 |
| KR | 1020060084694 | 7/2006 |

OTHER PUBLICATIONS

Office Action mailed Jun. 27, 2012 for Chinese Patent Application No. 200880112473.3 from SIPO.

Japanese Office Action for 2010-533954 dated Jun. 1, 2012.

* cited by examiner

METHOD, SYSTEM AND SERVER PLAYING MEDIA USING USER EQUIPMENT WITH MOTION SENSOR

CROSS REFERENCE TO RELATED APPLICATION

This application claims the priority of Korean Patent Application No. 10-2007-0116807, filed on Nov. 15, 2007 in the KIPO (Korean Intellectual Property Office), the disclosure of which are incorporated herein in their entirety by reference. Further, this application is the National Phase application of International Application No. PCT/KR2008/004786, filed Aug. 18, 2008, which designates the United States and was published in English. Each of these applications is hereby incorporated by reference in their entirety into the present application.

TECHNICAL FIELD

The present invention relates to a method for transmitting media stored in a server to user equipment, which incorporates a motion sensor having a communication function, and playing the media by the user equipment. More particularly, the present invention relates to a method for playing media stored in a server by using user equipment, which incorporates a motion sensor for moving and changing the playback region, wherein only a part of media stored in the server is transmitted first so that the user equipment solely plays the transmitted part, and the remaining part is transmitted and played later only after it is determined that a change of the playback region during playback requires the remaining part.

BACKGROUND ART

As generally known in the art, conventional technologies for downloading media from a server and playing them by user equipment are divided into two types: the entire media are downloaded and then played by the user equipment, or the media are streamed (i.e. packets of media are downloaded and played successively).

The streaming type lessens the communication burden on the user equipment or reduces the necessary storage capacity, and is widely employed.

As Internet technology has been recently developed and widely spread, various types of multimedia information are shared through the Internet more extensively than ever. As used herein, streaming refers to a type of data transfer, according to which a large amount of data is divided into packets of a predetermined size and transmitted from the server to the user s computer. Multimedia files (e.g. sounds, images) have a file size larger than that of text files, and it takes a long time to receive an entire multimedia file. According to the conventional download method, an entire file is transmitted and then watched. In contrast, according to the streaming method, a part of the entire file is transmitted and watched instantly, and the remaining part is continuously transmitted while the preceding part is being watched. The streaming method reduces the time to be spent until the file is ready to be watched, and is widely employed for Internet broadcasting, which provides a large amount of video and audio information.

Typical streaming methods include Real Media of RealNetworks and Windows Media Technology of Microsoft Corporation. In order to watch a streaming file on the web, the user needs to have a corresponding program, such as Real Player or Windows Media Player, installed on the computer. Real Media uses RM (*.rm) as a streaming file type and RAM (*.ram) as a metafile. Windows Media uses WMA (*.wma), WMV (*.wmv) and ASF (*.asf), as well as ASX (*.asx) as a metafile.

However, the conventional streaming methods have a problem in that they cannot substantially reduce the communication burden on the user equipment, and that the communication channel is occupied continuously.

DISCLOSURE OF INVENTION

Technical Problem

If the entire media are downloaded from the server to user equipment to be played, it takes a considerable amount of time to download the entire media. In addition, the media occupies a considerable storage space in the user equipment, and a considerable amount of the communication channel capacity is wasted.

If the media are streamed from the server to user equipment to be played in real time, a portion of the communication channel is continuously occupied, and even a part of media unnecessary to the user is transmitted together.

Therefore, the present invention has been made in view of the above-mentioned problems, and the present invention provides a method for reducing the necessary storage capacity of user equipment and efficiently using the communication channel (i.e. it is occupied less).

Particularly, the present invention provides a method for receiving playable media stored in a server by user equipment having a motion sensor and playing the media by a motion of the user equipment, the method including the steps of (a) designating a part of the media as a first receiving area by the server and transmitting the first receiving area to the user equipment; (b) changing a playback area, the media being played in the playback area, according to the motion of the user equipment and playing media corresponding to the playback area by the user equipment; and (c) requesting by the user equipment that the server provide a second receiving area when the playback area is outside the first receiving area of the media, designating a second receiving area by the server so that a part of the media contains the playback area, and providing the user equipment with the second receiving area so that the user equipment receives the second receiving area and plays the media.

Technical Solution

In accordance with an aspect of the present invention, there is provided a method for receiving playable media stored in a server by user equipment having a motion sensor and playing the media by a motion of the user equipment, the method including the steps of (a) designating a part of the media as a first receiving area by the server and transmitting the first receiving area to the user equipment; (b) changing a playback area, the media being played in the playback area, according to the motion of the user equipment and playing media corresponding to the playback area by the user equipment; and (c) requesting by the user equipment that the server provide a second receiving area when the playback area is outside the first receiving area of the media, designating a second receiving area by the server so that a part of the media contains the playback area, and providing the user equipment with the second receiving area so that the user equipment receives the second receiving area and plays the media.

Preferably, in step (a), the server designates the first receiving area based on information regarding a memory of the user equipment received from the user equipment, and transmits the first receiving area to the user equipment.

If the media are initially played by the user equipment, the first receiving area can be designated based on a predetermined position on the media according to the user settings. If there is a history of the media played by the user equipment, the first receiving area can be designated based on the user settings or the recent history of the media played by the user equipment. Particularly, the user equipment transmits recent playback area information, i.e. information regarding an area of the media recently played by the user equipment, to the server, which then designates the first receiving area to contain the recent playback area.

More preferably, the media have at least one playback reference axis for defining a playable area so that the media can be played in the playable area, the playback reference axis being a reference axis for moving and changing the playback area of the media, and in step (b), a motion of the user equipment corresponding to a direction of the playback reference axis is detected to move and change the playback area of the media according to the motion of the user equipment and to play the media in the playback area.

More preferably, the second receiving area is designated to contain the playback area based on information regarding a memory of the user equipment.

More preferably, the media have three-dimensional stereoscopic information, and the playback reference axis includes x-axis as a reference of movement direction along the x-axis, y-axis as a reference of movement of direction along the y-axis, and z-axis as a reference of movement of direction along the z-axis.

More preferably, the media have two-dimensional stereoscopic information, and the playback reference axis includes x-axis as a reference of movement direction along the x-axis, y-axis as a reference of movement direction along the y-axis, and z-axis for indicating a scale of enlarged playback of the media.

According to another aspect of the present invention, there is provided a system for receiving playable media stored in a server by user equipment having a motion sensor and playing the media by a motion of the user equipment, wherein the server receives a first receiving area transmission request of the user equipment, designates a partial area of the media as a first receiving area, and transmits the first receiving area to the user equipment, the user equipment receives the first receiving area from the server, changes a playback area, the media being played in the playback area, according to a motion of the user equipment, and plays media corresponding to the playback area, and when the playback area is outside the first receiving area of the media, the user equipment requests the server to provide a second receiving area, the second receiving area being a part of media containing the playback area, receives the second receiving area, and plays the media.

Preferably, the server designates the first receiving area based on information regarding a memory of the user equipment, and transmits the first receiving area to the user equipment.

If the media are initially played by the user equipment, the first receiving area can be designated based on a predetermined position on the media according to the user settings. If there is a history of the media played by the user equipment, the first receiving area can be designated based on the user settings or the recent history of the media played by the user equipment. Particularly, the user equipment transmits recent playback area information, i.e. information regarding an area of the media recently played by the user equipment, to the server, which then designates the first receiving area to contain the recent playback area.

More preferably, the second receiving area is designated to contain the playback area based on information regarding a memory of the user equipment.

More preferably, the media have at least one playback reference axis for defining a playable area so that the media can be played in the playable area, the playback reference axis being a reference axis for moving and changing the playback area of the media, and the user equipment detects a motion of the user equipment corresponding to a direction of the playback reference axis to move and change the playback area of the media according to the motion of the user equipment and to play the media.

More preferably, the media have three-dimensional stereoscopic information, and the playback reference axis includes x-axis as a reference of movement direction along the x-axis, y-axis as a reference of movement of direction along the y-axis, and z-axis as a reference of movement of direction along the z-axis.

More preferably, the media have two-dimensional stereoscopic information, and the playback reference axis includes x-axis as a reference of movement direction along the x-axis, y-axis as a reference of movement direction along the y-axis, and z-axis for indicating a scale of enlarged playback of the media.

More preferably, the user equipment includes a user input unit for receiving a user input; a motion sensing unit for detecting a motion of the user equipment; a playback unit for playing media corresponding to the playback area; a control unit for moving and changing the playback area of the media based on the inputted user input and the detected motion of the user equipment, the control unit playing the media corresponding to the playback area by the playback unit; a storage unit for storing the receiving area; and a communication unit for transmitting a request for transmission of the receiving area to the server and receiving media in the receiving area from the server.

More preferably, the server includes a media database storing the media; a receiving area designation unit for designating a receiving area from media in the media database in response to the receiving area transmission request of the user equipment; and a communication unit for receiving the first or second receiving area transmission request of the user equipment and transmitting the designated receiving area to the user equipment.

According to another aspect of the present invention, there is provided a server for storing playable media and transmitting the media to user equipment having a motion sensor, wherein the server receives a first receiving area request of the user equipment, designates a partial area of the media as a first receiving area based on information regarding a memory of the user equipment, and transmits the first receiving area to the user equipment, and the server receives information regarding a second receiving area request of the user equipment, designates a part of the media as a second receiving area based on playback area information used by the user equipment to play the media and information regarding the memory of the user equipment, and transmits the second receiving area to the user equipment.

Preferably, the media have at least one playback reference axis for defining a playable area so that the media can be played in the playable area, the playback reference axis being a reference axis for moving and changing the playback area of the media.

More preferably, the media have three-dimensional stereoscopic information, and the playback reference axis includes x-axis as a reference of movement direction along the x-axis, y-axis as a reference of movement of direction along the y-axis, and z-axis as a reference of movement of direction along the z-axis.

More preferably, the media have two-dimensional stereoscopic information, and the playback reference axis includes x-axis as a reference of movement direction along the x-axis, y-axis as a reference of movement direction along the y-axis, and z-axis for indicating a scale of enlarged playback of the media.

More preferably, the server includes a media database storing the media; a receiving area designation unit for designating a receiving area from media in the media database based on information regarding the memory of the user equipment in response to the receiving area transmission request of the user equipment; and a communication unit for receiving the receiving area transmission request and information regarding the memory of the user equipment from the user equipment and transmitting the receiving area to the user equipment.

Advantageous Effects

The present invention is advantageous in that, when media stored in the server have a playback area larger than can be played by the playback unit of the user equipment, media corresponding to the playback area can be played more economically and quickly than the prior art.

Particularly, the user equipment does not necessarily have the entire media from the server to play the media, but receives a part of the media first. The user equipment receives another part later after the part is confirmed to be necessary. This reduces the communication burden on the server and user equipment, and requires a smaller communication channel capacity.

BRIEF DESCRIPTION OF THE DRAWINGS

The foregoing and other objects, features and advantages of the present invention will become more apparent from the following detailed description when taken in conjunction with the accompanying drawings in which.

MODE FOR THE INVENTION

Hereinafter, exemplary embodiments of the present invention will be described with reference to the accompanying drawings.

As used herein, media include media having three-dimensional playback information, media having two-dimensional playback information, etc. Particularly, the media may have a playback area larger than the area that can be actually played by the playback unit of user equipment, and the playback area can move along the X, Y, or Z axis in the rectangular coordinate system. In the case of media having two-dimensional playback information, the playback region cannot move along the Z axis, which is perpendicular to a two-dimensional plane. Instead, the Z-axis information is used to scale the two-dimensional planar information, i.e. enlarge or change the resolution of the two-dimensional planar information. More particularly, the image is enlarged if the Z-axis distance decreases, and is reduced if the distance increases.

Figure 1:
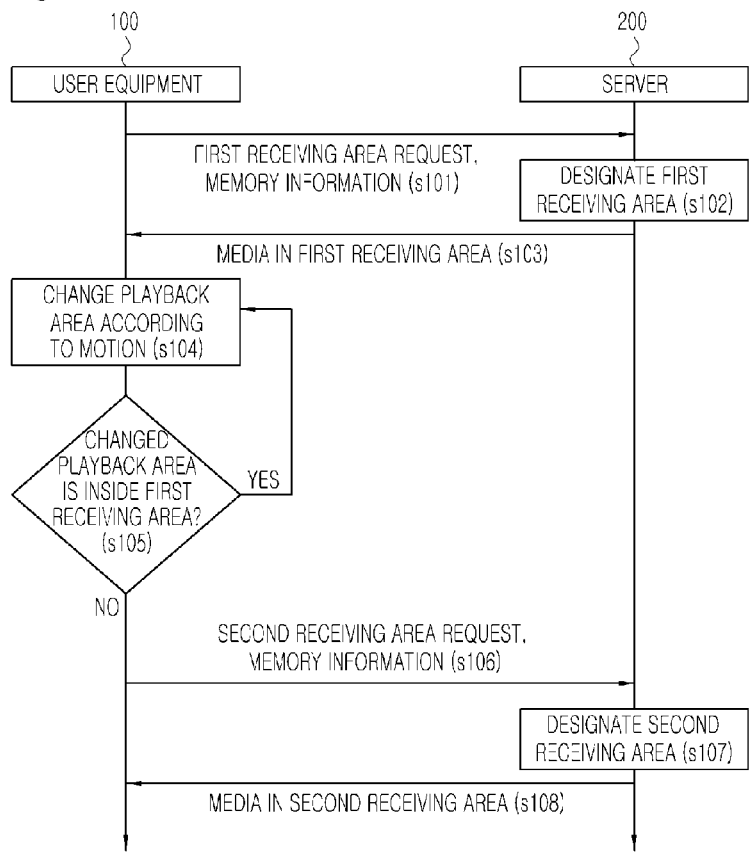
FIG. 1 is a flowchart showing a method for playing media by means of the motion of user equipment according to the present invention.

FIG. 1 is a flowchart showing a detailed method for playing media by means of the motion of user equipment according to the present invention.

Figure 2:
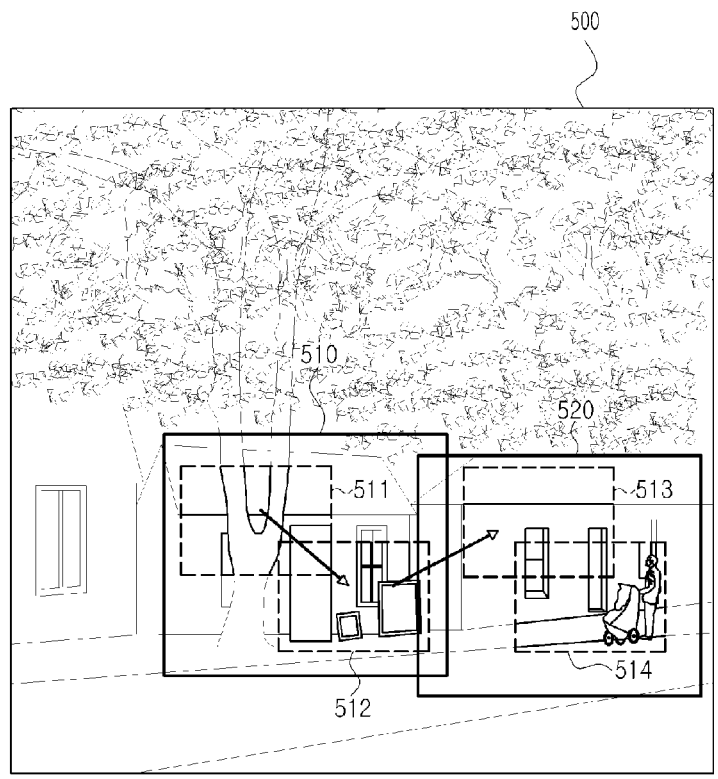
FIG. 2 shows an example of two-dimensional media, which have first and second receiving areas marked thereon, and which have a playback area moving in each receiving area.

FIG. 2 shows media according to the present invention, which have a two-dimensional planar image. Particularly, the playable media 500 according to an embodiment of the present invention have a two-dimensional picture image.

Figure 3:
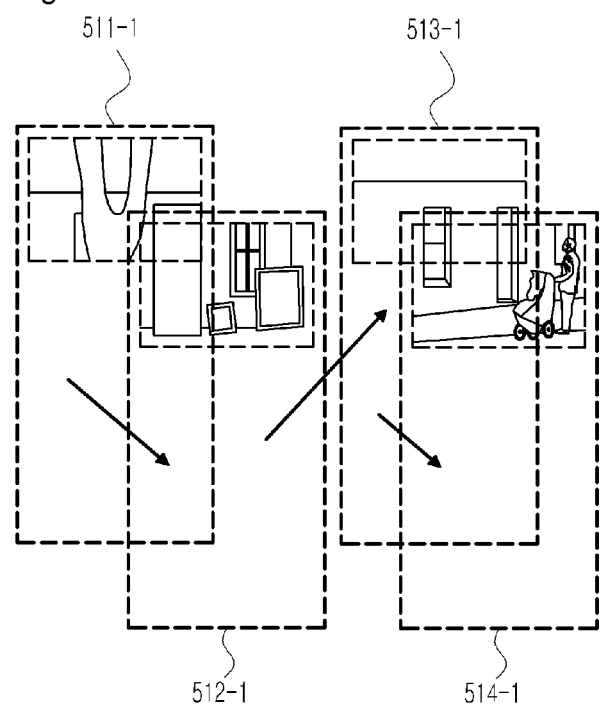
FIG. 3 shows the change and playback of the playback area as the user equipment changes its position.

FIG. 3 shows a change of the screen playback area according to the movement of user equipment, which has a motion sensor, according to the present invention.

In order to play the media, the user equipment 100 requests the server 200 to transmit a first receiving area. Particularly, the user equipment 100 requests the server to transmit the first receiving area together with information regarding the memory capacity of the user equipment, which is used to play media (S101). In this case, information regarding the position of the first playback area can be transmitted together to designate the first receiving area.

Based on the information regarding the memory capacity, the server 200 designates a part of the media as the first receiving area. Particularly, a specific area is selected from the entire area 500 of media within the limit of the memory capacity of the user equipment and is designated as the first receiving area. FIG. 2 shows an example of the first receiving area 510. If the media have a size larger than can be played, the user equipment initially receives the first receiving area only as far as the memory capacity of the user equipment permits. If the user equipment has delivered information regarding the position of the initial playback area, the first receiving area is preferably designated to include the playback area. If the user equipment has delivered no information regarding the position of the initial playback area, the central portion of the media is preferably designated within the limit of the memory capacity.

When the media are played by the user equipment for the first time, the first receiving area may be designated based on a predetermined position on the media according to the user settings. If the media have a history of playback by the user equipment, the first receiving area can be designated based on either the user settings or the recent history of playback of the media by the user equipment. More particularly, the user equipment transmits information regarding the position of the recent playback area, i.e. information regarding the recently played area of the media to the server, which then designates the first receiving area to include the recent playback area.

When the user equipment receives the first receiving area (S103), playback proceeds within the range of the first receiving area by using the motion sensor of the user equipment. Particularly, the motion of the user equipment is detected while the playback area 511 is played within the range of the first receiving area 510 shown in FIG. 2, and the playback area 511 is changed in a direction corresponding to the motion of the user equipment. For example, assuming that the user equipment moves from position 511-1 to 514-1 through 512-1 and 513-1 as shown in FIG. 3, the playback area shown in FIG. 2 changes its position from 511 to 514 through 512 and 513. It is to be noted that, even if the playback area is changed from 511 to 512 as a result of the movement of the user equipment from 511-1 to 512-1, the server is not requested to newly transmit media, because the user equipment has already received the first receiving area 510, in which the playback area 512 can be played.

If the position of the user equipment changes from 512-1 to 512-3, the user equipment detects this motion and changes the playback area from 512 to 513. However, the playback area 513 is not included in the first receiving area of the media. This means that the playback area 513 cannot be played instantly solely based on the first receiving area, which has been stored and played up to the present time. Therefore, the user equipment instantly requests the server to provide the second receiving area. In this case, the user equipment transmits both information regarding the position of the playback area 513 to be played instantly and information regarding the available memory capacity of the user equipment so that the server can properly designate the second receiving area.

That is, after receiving the first receiving area, the user equipment changes the playback area and plays it. The user equipment determines if the playback area is within the first receiving area (S105). If so, the playback proceeds with no change, and if the playback area is outside the first receiving area, the user equipment requests the server to newly transmit the second receiving area (S106).

After receiving the information regarding the position of the new playback area and the available memory capacity of the user equipment, the server designates the second receiving area (S107), and transmits media corresponding to the second receiving area to the user equipment (S108).

This process will be described in more detail with reference to FIGS. 2 and 3. The position of the user equipment has changed from 512-1 to 513-1, and in response to this change, the position of the playback area, which is played by the user equipment, changes its position from 512 to 513. In this case, the playback area 513 is not included in the first receiving area 510. Therefore, the server designates the second receiving area within the limit of the available memory capacity, which is based on information regarding the memory of the user equipment, so that the playback area 513 is included, and transmits media in the second receiving area to the user equipment.

After the user equipment receives the second receiving area, the playback area is changed (from 513-1 to 514-1) based on the motion of the user equipment and is played (from 513 to 514). In this case, the playback area is included in the receiving area, which has already been received, without interruption. In other words, no new receiving area of media needs to be received, and instant playback is possible.

In the case of three-dimensional media, the user equipment can move in three directions (along x, y, and z axes), and the playback area can also change in three directions. In the case of two-dimensional media on the xy plane, the z-axis may be used to set the image enlargement factor and enlarge or adjust the resolution of the image.

Figure 4:
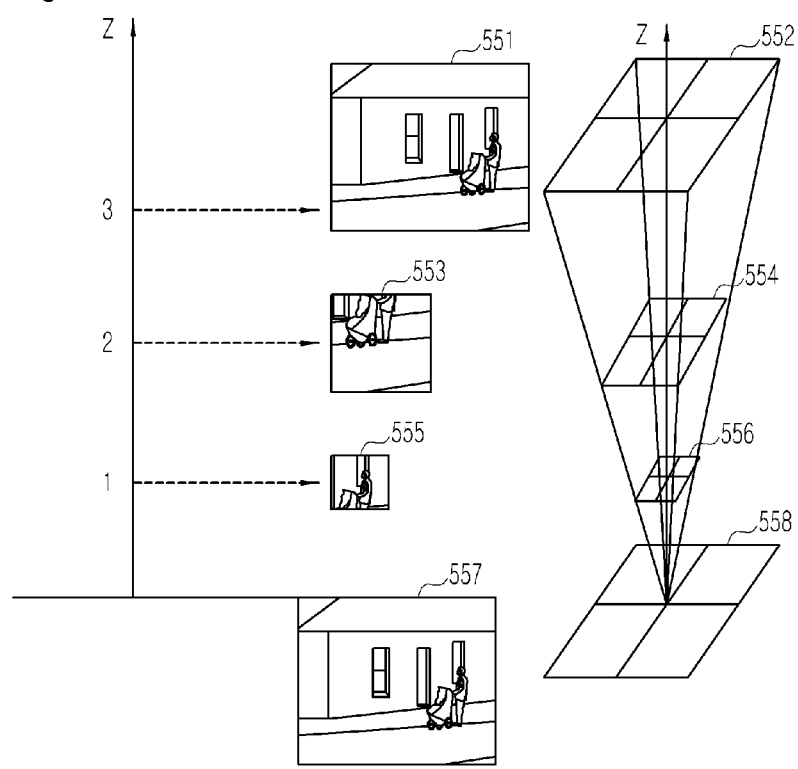
FIG. 4 shows enlarged playback of an planar image as the user equipment moves along the vertical axis.

FIG. 4 shows an exemplary image on the xy plane, which is enlarged or reduced according to a motion along the z-axis.

Particularly, it can be said that if the position on the z-axis is 2, the distance to the xy plane is 2. Then, an enlarged image is designated as the playback area 554 and is played 553. If the user equipment is moved forward to position 3, the distance to the xy plane increases to 3. Then, a larger playback area is designated 552, and the image appears in a larger area 551. In other words, the image looks reduced. In contrast, if the user equipment moves downward to z-axis position 1, the distance to the xy plane becomes 1, and a small playback area is designated 556. The image appears in a smaller area 555. In other words, the image is enlarged and played.

Figure 5:
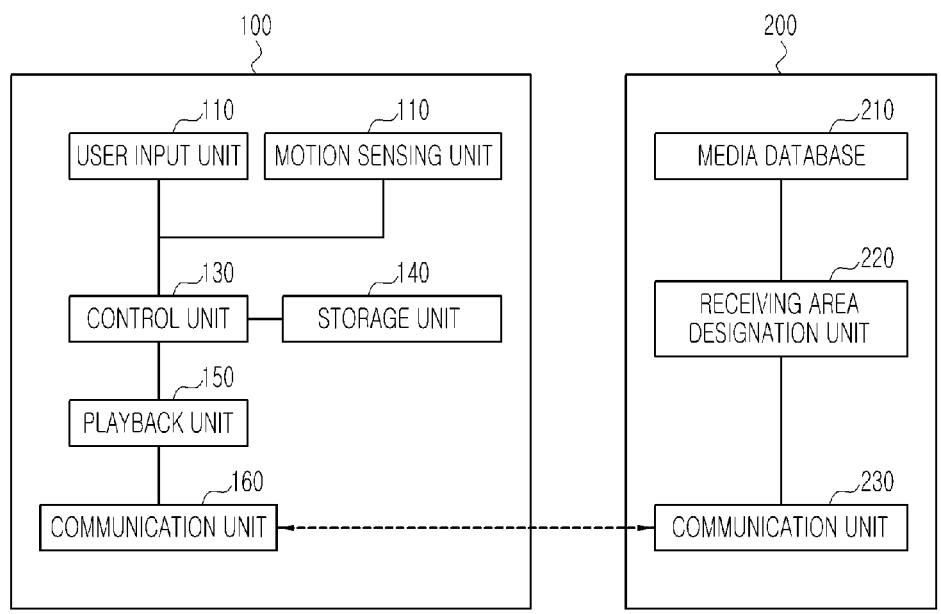
FIG. 5 shows the construction of a system for playing media by means of the motion of user equipment.

FIG. 5 shows a system for playing media by means of the motion of user equipment according to the present invention. The system includes user equipment 100 having a motion sensor and a server 200.

The user equipment 100 includes a user input unit 110, a motion sensing unit 120 incorporating a motion sensor, a control unit 130, a playback unit 150, a storage unit 140, and a communication unit 160.

The user equipment sends a first receiving area transmission request and information regarding the available memory capacity of the storage unit to the server. Then, the user equipment receives a first receiving area of media from the server, and stores it in the storage unit.

The control unit changes the playback area, which is included in the first receiving area, based on position movement information inputted via the user input unit or the motion sensing unit incorporating the motion sensor. Media corresponding to the playback area are played by the playback unit under the control of the control unit. If the playback area is not included in the first receiving area, the control unit requests the server to newly transmit a second receiving area.

The server 200 includes a media database 210 storing playable media, a receiving area designation unit 220 for designating a receiving area, and a communication unit 230 for transmitting a receiving area and receiving a request for the receiving area, etc.

Upon receiving a first or second receiving area transmission request, the receiving area designation unit 220 of the server designates a first or second receiving area of media by using media from the media database within the limit of the available memory capacity of the user equipment, and transmits media in the corresponding area to the user equipment via the communication unit 230.

The user equipment may transmit information regarding the desired position of the playback area and memory information to the server together with a first receiving area request. Then, the receiving area designation unit of the server designates the first receiving area within the limit of the available memory capacity of the user equipment so that the playback area is included in the first receiving area. If the user equipment has transmitted no information regarding the position of the playback area, the first receiving area is preferably designated by default with reference to the central position.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As mentioned above, the present invention provides a method for receiving playable media stored in a server by user equipment having a motion sensor and playing the media, the method including the steps of (a) designating a part of the media as a first receiving area by the server and transmitting it to the user equipment; (b) changing a playback area, in which the media are played, according to the motion of the user equipment and playing a part of the media; and (c) requesting by the user equipment that the server provide a second receiving area, which is a part of the media including the playback area, when the playback area is outside the first receiving area of the media, receiving the second receiving area, and playing the media.

Therefore, the present invention is advantageous in that, if media stored in the server have a playback area larger than can be played by the playback unit of the user equipment, the playback area of media can be played in an economic and fast manner. Particularly, the user equipment does not need to receive the entire media stored in the server. Instead, only a part of media is transmitted first, and the remaining part is transmitted later after confirming that the transmission is necessary. This reduces communication burden on the server and user equipment, and decreases the necessary communication channel capacity.

Consequently, the present invention is industrially applicable to the communication service industry field.

The invention claimed is:

1. A method for receiving playable media stored in a server by user equipment having a motion sensor and playing the media by a motion of the user equipment, the method comprising the steps of:
   (a) designating a part of the media as a first receiving area by the server and transmitting the first receiving area to the user equipment, wherein the part of the media is less than an entirety of the media;
   (b) changing a playback area, the media being played in the playback area, according to the motion of the user equipment and playing media corresponding to the playback area by the user equipment; and
   (c) requesting by the user equipment that the server provide a second receiving area when the playback area is outside the first receiving area of the media, designating another part of the media as the second receiving area by the server so that the another part of the media contains the playback area, and providing the user equipment with the second receiving area so that the user equipment receives the second receiving area and plays the media, wherein the another part of the media is less than an entirety of the media, the second receiving area overlaps with the first receiving area, and requesting by the user equipment occurs prior to transmitting the another part of the media.

2. The method as claimed in claim 1, wherein, in step (a), the server designates the first receiving area based on information regarding a memory of the user equipment received from the user equipment, and transmits the first receiving area to the user equipment.

3. The method as claimed in claim 1, wherein, in step (a), when there is a history of the media played by the user equipment, the server receives recent playback area information from the user equipment, the recent playback area information being information regarding an area recently played by the user equipment, designates the first receiving area based on the recent playback area information, and transmits the first receiving area to the user equipment.

4. The method as claimed in claim 1, wherein the media have at least one playback reference axis for defining a playable area so that the media can be played in the playable area, the playback reference axis being a reference axis for moving and changing the playback area of the media, and in step (b), a motion of the user equipment corresponding to a direction of the playback reference axis is detected to move and change the playback area of the media according to the motion of the user equipment and to play the media in the playback area.

5. The method as claimed in claim 1, wherein the second receiving area is designated to contain the playback area based on information regarding a memory of the user equipment.

6. The method as claimed in claim 4, wherein the media have three-dimensional stereoscopic information, and the playback reference axis comprises x-axis as a reference of movement direction along the x-axis, y-axis as a reference of movement of direction along the y-axis, and z-axis as a reference of movement of direction along the z-axis.

7. The method as claimed in claim 4, wherein the media have two-dimensional stereoscopic information, and the playback reference axis comprises x-axis as a reference of movement direction along the x-axis, y-axis as a reference of movement direction along the y-axis, and z-axis for indicating a scale of enlarged playback of the media.

8. A system for receiving playable media stored in a server by user equipment having a motion sensor and playing the media by a motion of the user equipment, wherein
   the server receives a first receiving area transmission request of the user equipment, designates a partial area of the media as a first receiving area, and transmits the first receiving area to the user equipment, the partial area of the media is less than an entirety of the media,
   the user equipment receives the first receiving area from the server, changes a playback area, the media being played in the playback area, according to a motion of the user equipment, and plays media corresponding to the playback area, and
   when the playback area is outside the first receiving area of the media, the user equipment requests the server to provide another part of the media as a second receiving area, the second receiving area being the another part of media containing the playback area, receives the second receiving area, and plays the media, wherein the another part of the media is less than an entirety of the media, the second receiving area overlaps with the first receiving area, and the sever is configured to provide the another part of the media only after receiving the user equipment request.

9. The system as claimed in claim 8, wherein the server designates the first receiving area based on information regarding a memory of the user equipment, and transmits the first receiving area to the user equipment.

10. The system as claimed in claim 8, wherein, when there is a history of the media played by the user equipment, the server receives recent playback area information from the user equipment, the recent playback area information being information regarding an area recently played by the user equipment, designates the first receiving area based on the recent playback area information, and transmits the first receiving area to the user equipment.

11. The system as claimed in claim 8, wherein the second receiving area is designated to contain the playback area based on information regarding a memory of the user equipment.

12. The system as claimed in claim 8, wherein the media have at least one playback reference axis for defining a playable area so that the media can be played in the playable area, the playback reference axis being a reference axis for moving and changing the playback area of the media, and the user equipment detects a motion of the user equipment corresponding to a direction of the playback reference axis to move and change the playback area of the media according to the motion of the user equipment and to play the media.

13. The system as claimed in claim 12, wherein the media have three-dimensional stereoscopic information, and the playback reference axis comprises x-axis as a reference of movement direction along the x-axis, y-axis as a reference of movement of direction along the y-axis, and z-axis as a reference of movement of direction along the z-axis.

14. The system as claimed in claim 12, wherein the media have two-dimensional stereoscopic information, and the playback reference axis comprises x-axis as a reference of movement direction along the x-axis, y-axis as a reference of movement direction along the y-axis, and z-axis for indicating a scale of enlarged playback of the media.

15. The system as claimed in claim 8, wherein the user equipment comprises:

a user input unit for receiving a user input;

a motion sensing unit for detecting a motion of the user equipment;

a playback unit for playing media corresponding to the playback area;

a control unit for moving and changing the playback area of the media based on the inputted user input and the detected motion of the user equipment, the control unit playing the media corresponding to the playback area by the playback unit;

a storage unit for storing the receiving area; and a communication unit for transmitting a request for transmission of the receiving area to the server and receiving media in the receiving area from the server.

16. The system as claimed in claim 8, wherein the server comprises:

a media database storing the media;

a receiving area designation unit for designating a receiving area from media in the media database in response to the receiving area transmission request of the user equipment; and a communication unit for receiving the first or second receiving area transmission request of the user equipment and transmitting the designated receiving area to the user equipment.

17. A server for storing playable media and transmitting the media to user equipment having a motion sensor, wherein the server receives a first receiving area request of the user equipment, designates a partial area of the media as a first receiving area based on information regarding a memory of the user equipment, and transmits the first receiving area to the user equipment, wherein the partial area of the media is less than an entirety of the media, and the server receives information regarding a second receiving area request of the user equipment, designates another part of the media as a second receiving area based on playback area information used by the user equipment to play the media and information regarding the memory of the user equipment, and transmits the second receiving area to the user equipment, wherein the another part of the media is less than an entirety of the media, the second receiving area overlaps with the first receiving area, and the server is configured to transmit the another part of the media only after receiving the request of the user equipment.

18. The server as claimed in claim 17, wherein the media have at least one playback reference axis for defining a playable area so that the media can be played in the playable area, the playback reference axis being a reference axis for moving and changing the playback area of the media.

19. The server as claimed in claim 18, wherein the media have three-dimensional stereoscopic information, and the playback reference axis comprises x-axis as a reference of movement direction along the x-axis, y-axis as a reference of movement of direction along the y-axis, and z-axis as a reference of movement of direction along the z-axis.

20. The server as claimed in claim 18, wherein the media have two-dimensional stereoscopic information, and the playback reference axis comprises x-axis as a reference of movement direction along the x-axis, y-axis as a reference of movement direction along the y-axis, and z-axis for indicating a scale of enlarged playback of the media.

21. The system as claimed in claim 17, wherein the server comprises:

a media database storing the media;

a receiving area designation unit for designating a receiving area from media in the media database based on information regarding the memory of the user equipment in response to the receiving area transmission request of the user equipment; and a communication unit for receiving the receiving area transmission request and information regarding the memory of the user equipment from the user equipment and transmitting the receiving area to the user equipment.

* * * * *